United States Patent [19]

Sims

[11] 4,056,687
[45] Nov. 1, 1977

[54] DECOUPLING CONTROL ARRANGEMENT FOR AUXILIARY CIRCUITS COUPLED TO TELEPHONE LINES

[75] Inventor: Robert Dennis Sims, Addison, Ill.

[73] Assignee: Western Electric Company, New York, N.Y.

[21] Appl. No.: 714,592

[22] Filed: Aug. 16, 1976

[51] Int. Cl.² .................. H04M 3/22; H04B 3/46
[52] U.S. Cl. .................. 179/16 F; 179/175.31 R
[58] Field of Search ...... 179/16 F, 175.3 R, 175.31 R

[56] References Cited

U.S. PATENT DOCUMENTS

| 3,757,052 | 9/1973 | Tothill | 179/175.31 R |
| 3,763,320 | 10/1973 | Chambers, Jr. | 179/16 F |
| 3,825,698 | 7/1974 | Chambers, Jr. | 179/16 F |
| 3,828,139 | 8/1974 | Chambers, Jr. | 179/16 F |

OTHER PUBLICATIONS

Bell Telephone Labs Technical Disclosure Article; "Message and Signal Repeater Circuit;" Mar. 17, 1969; Sheets B6 and B8.

Primary Examiner—Kathleen H. Claffy
Assistant Examiner—Randall P. Myers
Attorney, Agent, or Firm—Charles H. Davis

[57] ABSTRACT

A common control circuit is disclosed for controlling bypassing relays to disconnect telephone line auxiliary circuits from their respective lines preparatory to line testing or for other desired purposes. The control circuit responds to a bypass request signal applied to a line by operating an associated bypassing relay and by activating a timing circuit. The timing circuit and other circuitry cooperate to hold the bypassing relay operated for a time interval sufficient for fulfilling the purpose of the bypass. For serving a bypass request received while another request is being served, the appropriate bypassing relay is operated when the subsequent request is received and the timing circuit is reactivated to insure a sufficient test time for the subsequent request. All operated bypassing relays are held operated until the expiration of a time interval during which no new bypass requests are received.

The control circuit includes monitoring circuitry operative to detect selected internal and external failure conditions.

32 Claims, 3 Drawing Figures

DECOUPLING CONTROL ARRANGEMENT FOR AUXILIARY CIRCUITS COUPLED TO TELEPHONE LINES

BACKGROUND OF THE INVENTION

This invention pertains to telephone systems in general and, in particular, to control arrangements for decoupling auxiliary circuits from telephone lines to which they are coupled. The term line as herein used may refer to lines which interconnect telephone stations to central exchanges, to trunks which interconnect central exchanges and to virtually any other transmission media in which a need arises to bypass or disconnect temporarily circuits coupled or interposed in the transmission media.

By way of example only, an illustrative, exemplary disclosure of my invention herein is concerned with telephone line extender circuits. In a telephone system, the stations served by an exchange are, of course, located at various distances from the exchange. At the greater distances, the increased impedance of station lines limits the ability of the exchange to properly transmit and receive supervisory and voice signals to and from the stations without measures to overcome the incresed impedance. A common solution to this problem is to equip such lines with line extender circuits which operate to aid the line voltage supplied to the exchange or to repeat signals at some intermediate point along the line.

In order to test station lines, it is common to provide an exchange with a test frame and access network by means of which personnel may gain access to any desired line and apply tests thereto such as for continuity, foreign potential, impedance and the like. The use of line extender circuits, however, generally interferes with such tests. For example, the signal repeating extender circuits referred to above interrupt line continuity and, accordingly, preclude certain tests such as for continuity and impedance. The voltage aiding types of extender circuits do not interrupt line continuity, but interfere instead with certain tests at least to the extent of introducing false or misleading test results.

One common method employed to prevent extender circuit test interference is to arrange each circuit with a bypassing relay whose contacts connect appropriate ones of the input and output extender circuit terminals to shunt the circuit during periods of line testing. One such arrangement is illustrated in U.S. Pat. No. 3,825,698, which issued to C. W. Chambers, Jr. on July 23, 1974. In that arrangement, a signal detector detects a specific combination of voltages on the conductors of a telephone line indicating a test condition and, in response, operates a bypassing relay for the duration of the appearance of the specific voltage combination. Many variations of the bypassing relay method are known. Nevertheless, in the known prior art, each extender circuit is equipped with individual circuitry for controlling the operation and release of its bypassing relay. This type of arrangement, although simple in that no structure for handling multiple bypass requests is required, is expensive in the provision of redundant control facilities for each line extender circuit. Thus, a need arises for a simple and inexpensive circuit to control the operation and release of a plurality of such bypassing relays and which has the ability of simultaneously processing multiple bypass requests. Furthermore, a need exists for a bypass arrangement that may be economically retrofitted to the great many extender circuits now in service which are not equipped for bypass operation and which thus present difficulties in the routine testing of the respective lines.

SUMMARY OF THE INVENTION

For fulfilling the foregoing needs, I provide, for use with a plurality of auxiliary circuits each coupled to an individual telephone line and associated with individual means for decoupling the auxiliary circuit from its lines, a novel circuit for controlling each of the decoupling means. The control circuit responds to individual request signals to operate the decoupling means associated with each of the request signals. Holding circuitry responds to a first request signal to hold the associated decoupling means operated for at least a prescribed time interval. Other circuitry responds to subsequent request signals received during a prescribed time interval to control the holding circuitry so that the decoupling means associated with the first and subsequent request signals are held operated for at least the duration of another prescribed time interval.

In a preferred exemplary embodiment involving line extender circuits, the control circuit is responsive to each of the detectors to operate an associated bypassing relay upon receipt of a request signal on the appropriate line. A timing circuit is activated in response to an initial request and controls a holding path for the operated bypassing relay for a time interval during which tests may be applied to the line. In the event subsequent requests are received during the time interval, the appropriate bypassing relays are operated at the time of receipt of the requests and, at the expiration of the time interval, the timing circuit is reactivated to hold operated each operated bypassing relay for at least another time interval. This advantageously provides for processing overlapping requests and guarantees at least a minimum time interval for testing any line. The bypassing relays and request signal detectors may be provided with the control circuit for retrofit to existing extender circuits which are not so equipped. Contacts of the bypassing relays may be easily connected to the appropriate extender circuits by mere cabling from the location of the control circuit to the location of the extender circuits. Each request signal detector may be similarly cabled for connection to a station line to detect prescribed request signals applied thereto.

One feature of my invention is the provision of a single circuit for controlling the operation of decoupling means for a plurality of auxiliary circuits coupled to telephone lines.

Another feature of my invention is the provision of a timing circuit for controlling the operation of decoupling means for at least a prescribed time interval.

Another feature of my invention is the provision of circuitry allowing for the processing of multiple requests for decoupling by controlling the reactivations of the timing circuit in response to overlapping requests.

Still another feature of my invention is an arrangement whereby operated decoupling means effects a disconnection of an associated request signal detector from its line to prevent test interference therefrom.

Yet another feature is the provision of circuitry for monitoring the operations of the control circuit to detect internal and external failure conditions which result in improper operation thereof.

BRIEF DESCRIPTION OF THE DRAWING

A more detailed understanding of my invention will be apparent from the following detailed description of an exemplary embodiment thereof, when read in conjunction with the accompanying drawing, in which.

DETAILED DESCRIPTION

Figure 1:
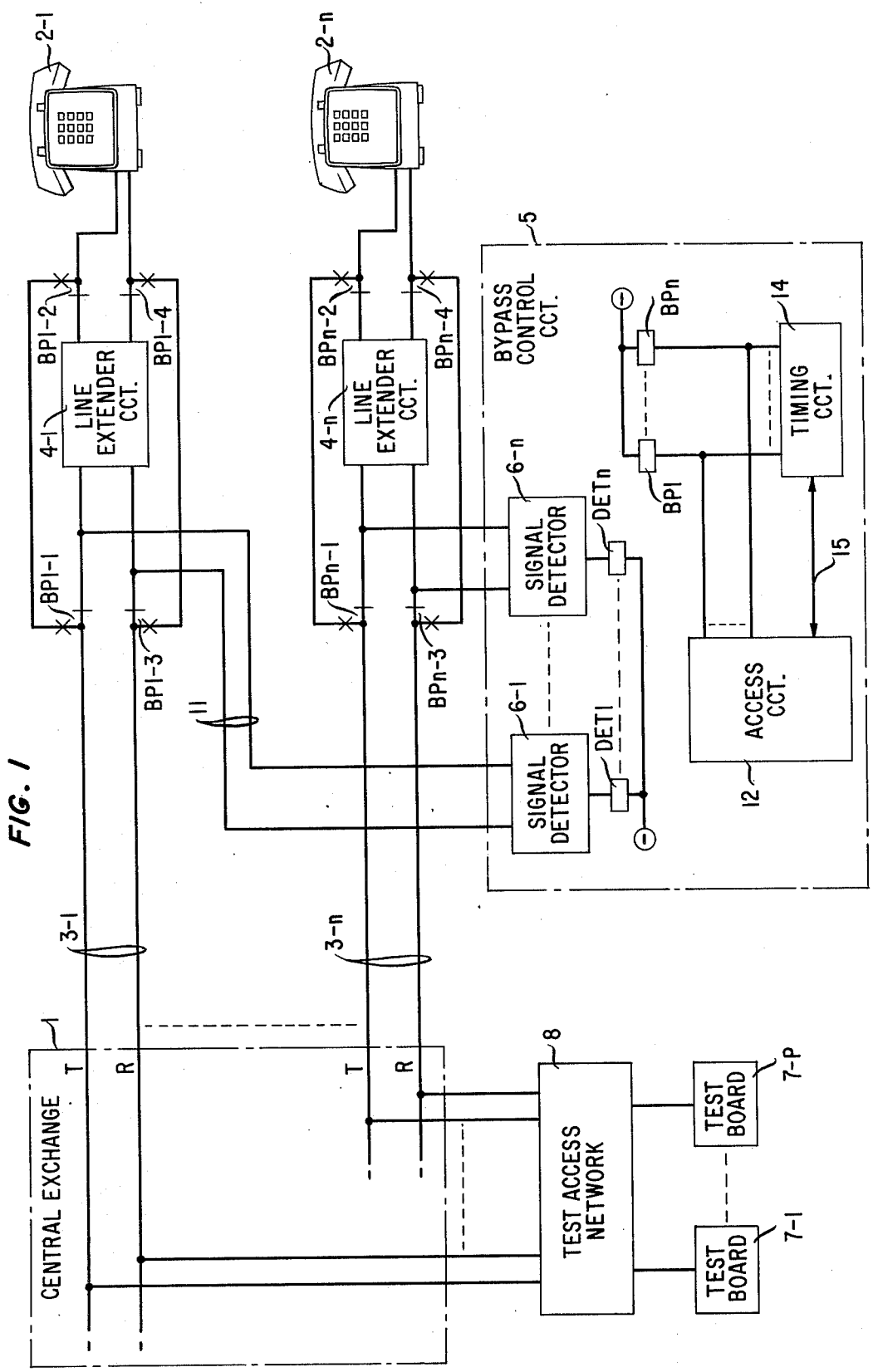
FIG. 1 is a simplified block diagram of a telephone system including a plurality of station lines associated with line extender circuits and bypassing relays, and a bypassing relay control circuit with the salient aspects thereof.

FIG. 1 shows a central telephone exchange 1 serving a plurality of stations 2-1 to 2-n by means of lines 3-1 to 3-n. Each of the lines is assumed in this discussion to be of such a length as to require the use of line extender circuits 4-1 to 4-n for adequate signaling and voice communication.

In order to disconnect a line extender circuit from its associated line for purposes of line testing, each circuit 4-1 to 4-n is associated with one of a plurality of bypassing relays BP1 to BPn, illustratively shown in FIG. 1 as part of bypass control circuit 5. Transfer contacts of each of the bypasing relays, such as BP1-1 to BP1-4, are connected to the tip and ring leads of an associated one of the lines 3-1 to 3-n so that when operated the contacts effectively disconnect an extender circuit from its line.

Each extender circuit has connections from the exchange side of a line to one of a plurality of signal detectors 6-1 to 6-n. Each signal detector operates to detect a prescribed bypass request signal applied to its line and, in turn, activates control circuit 5 to cause an operation of an associated bypassing relay. Exchange 1 personnel are provided with test boards 7-1 to 7-P and a test access network 8 by means of which the test boards may gain access to any desired one of the lines 3-1 to 3-n in order to apply line tests thereto. After gaining such access, the tester operates a key at a test board to apply the request signal to the selected line. Assuming that line 3-1 is selected, for example, the signal is extended along line 3-1 and through break contacts BP1-1 of relay BP1 to cable 11 and thence to signal detector 6-1 in control circuit 5. Signal detector 6-1 responds by operating a relay DET1 to initiate operations of control circuit 5.

Control circuit 5 includes an access circuit 12 and a timing circuit 14 which cooperate to control the operation of the bypassing relays BP1 to BPn. Relay DET1 has contacts (not shown in FIG. 1) in access circuit 12 which initially control the operation of bypassing relay BP1 in response to the request. Other contacts of relay DET1 activate timing circuit 14. Timing circuit 14, in turn, controls access circuit 12 to hold bypassing relay BP1 operated for a prescribed timing interval sufficient in duration to allow the tester to complete the testing of line 3-1. At the expiration of the timing interval, relay BP1 is released, assuming that no other bypass request signals from another test board were received during the interim.

In accordance with a feature of this invention, access circuit 12 and timing circuit 14 operate for serving overlapping bypass requests in such a manner that a tester is guaranteed a minimum prescribed time interval during which tests may be applied to a line. In this illustrative embodiment, this feature is accomplished by arranging access circuit 12 to operate any of the bypassing relays BP1 to BPn upon receipt of an associated request signal and, in the event a prior request is being served at the time of receipt, to reactivate timing circuit 14. Illustratively, the reactivation is performed at the expiration of the timing internal then in progress. Each priorly operated bypassing relay therefore remains operated for at least the duration of another prescribed timing interval. It is understood, however, that my invention is not to be limited to this specific embodiment. In view of this teaching, it is within the skill of art workers to devise other variations which are within the scope and spirit thereof. For example, one might easily modify the exemplary control circuit 5 to reactivate the timing circuit 14 immediately upon receipt of an overlapping bypass request.

Figure 2:
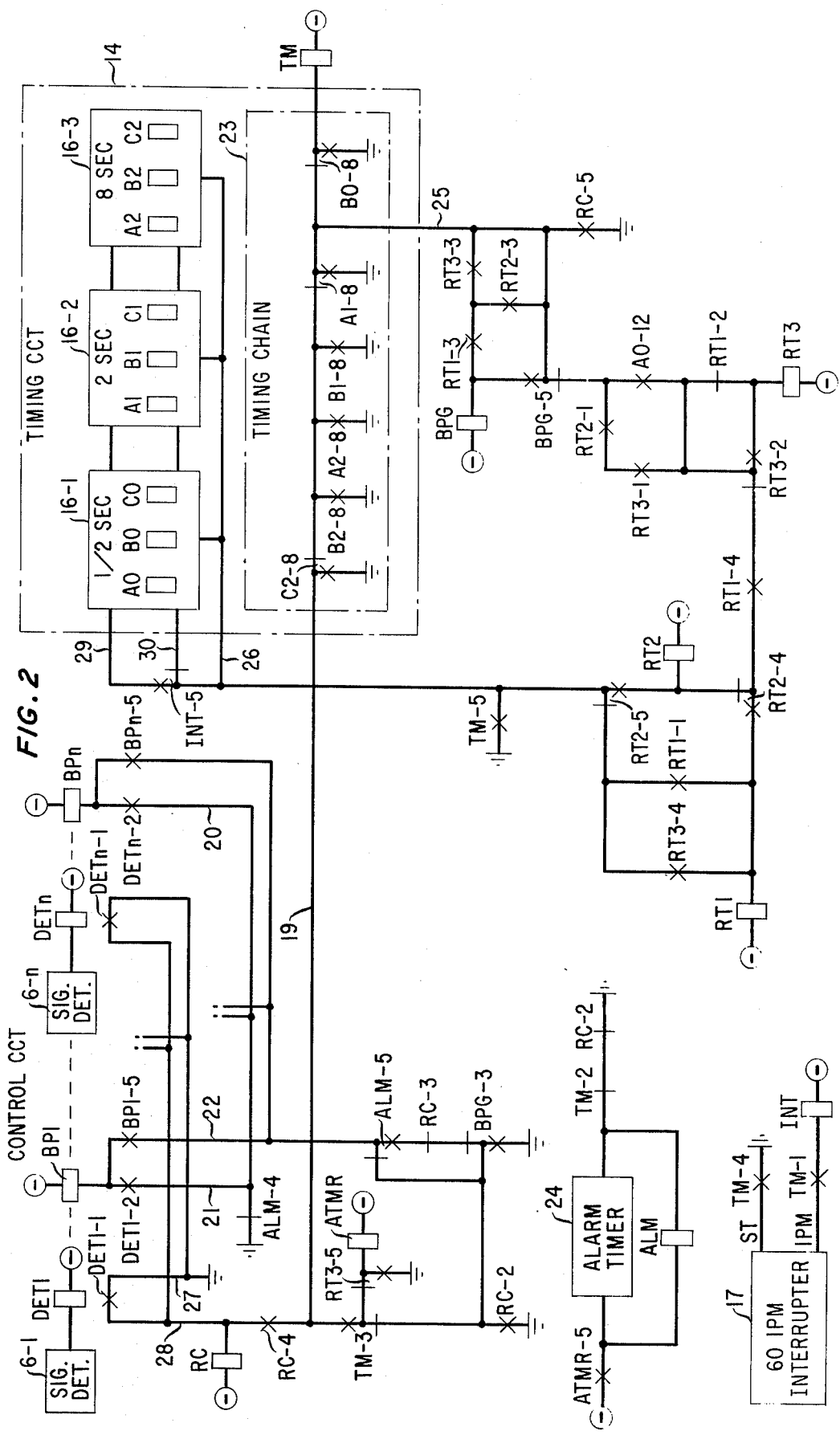
FIG. 2 is a detailed schematic of a preferred embodiment of the control circuit including a timing circuit.

A preferred exemplary embodiment of bypass control circuit 5 is illustrated in FIG. 2. The signal detectors 6-1 to 6-n are shown at the top of the figure absent their respective connections to lines 3-1 to 3-n. The delays DET1 to DETn and BP1 to BPn are shown immediately beside their respective signal detectors. The remaining circuitry in FIG. 2, exclusive of timing circuit 14, represents that of access circuit 12.

Figure 3:
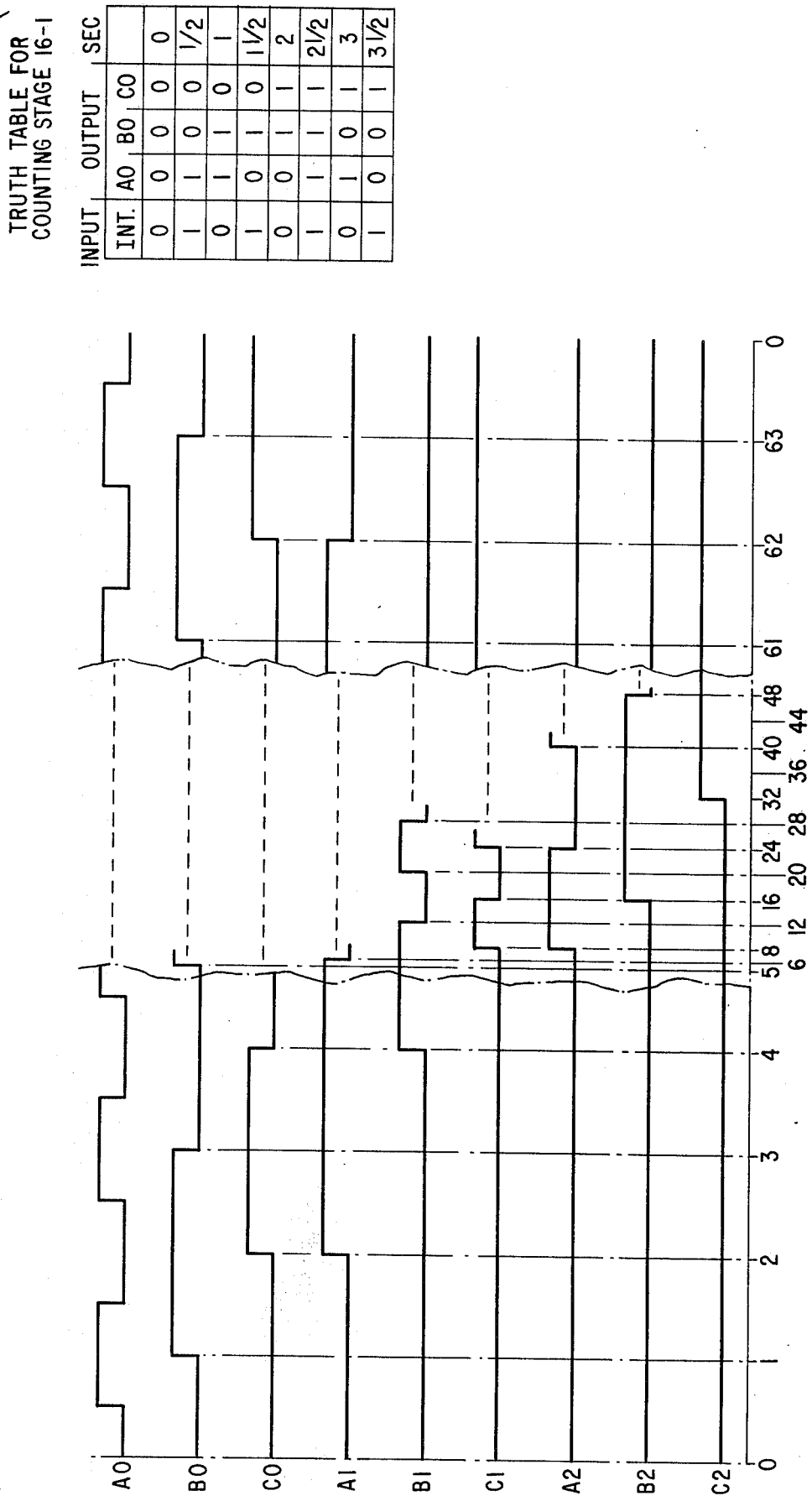
FIG. 3 is a series of waveforms and a logic truth table both depicting relay states as a function of time of a counter which forms a part of the timing circuit.

Timing circuit 14 illustratively comprises three counting circuits 16-1, 16-2, and 16-3, each of which includes three counting relays designated in the respective counting circuits as A0 to C0, A1 to C1, and A2 to C2. The counting relays are operated by pulses from a 60 impulse-per-minute interrupter 17 in a manner to be described. Counting stage 16-1 is operated directly by contacts of relay INT, which, in turn, is operated by interrupter 17. Counting stages 16-2 and 16-3, in turn, are operated by contacts (not shown) of respective counting relays C0 and C1. This arrangement provides for 128 count states. The counting stages are controlled to count both leading and trailing edges of interrupter 17 pulses to provide an illustrative timing interal of 64 seconds. The circuit details of counting stages 16-1 to 16-3 are not discussed, since the design of such a counter or equivalent thereof is well within the state of the art. For completeness, however, and ease of understanding of the control signals, to be described, generated by timing circuit 14, a series of waveforms of the states of the relays of counting stages 16-1 to 16-3 are shown in FIG. 3 as a function of time, along with a logic truth table of those states for counting stage 16-1. The reader will find it convenient to consider that counting stage 16-1 counts at ½-second intervals, that stage 16-2 counts at 2-second intervals, and that stage 16-3 counts at 8 second intervals. In the input column of the truth table, each "1" represents an operation of relay INT and each "0" represents a release of that relay. The output columns depict the state of the counting relays A0 to C0 resulting from the corresponding operation or release of the INT relay. The column SEC gives the times of occurrences (during the first 4 seconds of a timing interval) of the events depicted in each row of the table. Since counting stage 16-2 and 16-3 are identical to counting stage 16-1, this truth table also provides the logic data for the former two stages if the following changes to the table are made: for stage 16-2, replace INT with C0, A0 to B0 with A1 to B1, and modify the SEC column to 2 second spacing between events; for stage 16-2, replace INT with C1, A0 to C0 with A2 to C2, and modify the SEC column to 8 second spacing between events.

Assume now that control circuit 5 is idle with all relays released and that a bypass request signal is received on line 3-1 in FIG. 1. The signal is detected by signal detector 6-1 which responds by operating relay DET1 by means of an obvious connection. In FIG. 2, relay DET1 operates its make contact DET1-1 located between leads 27 and 28 and completes a ground connection for operating relay RC. The operation of relay DET1 also completes a temporary path for operating bypassing relay BP1. This path extends through the coil of relay BP1, a make contact DET1-2 of relay DET1 in lead 21 and break contact ALM-4 of alarm relay ALM to ground. The operation of relay BP1 disconnects both the line extender circuit 4-1 and signal detector 6-1 from line 3-1, as shown by the transfer contacts BP1-1 to BP1-4 in line 3-1 of FIG. 1. Relay DET1 releases as a result of the disconnection of signal detector 6-1 from line 3-1. Relay BP1 remains operated, however, by means of a holding path established by its make contact BP1-5 in lead 22, break contact ALM-5 and make contact RC-2 to ground. Relay RC is held operated by a path which extends through the relay coil RC, make contact RC-4, lead 19, break contacts C2-8 and A1-8 of the timing chain 23 in circuit 14, lead 25 and make contact RC-5 to ground.

An alarm timer 24 having an illustrative 85-second time period is provided and functions in the detection of certain types of fault conditions that may result in the continuous operation of control circuit 5. The fault monitoring operations are described in detail hereinafter. For the time being, however, note that the operation of relay RC causes an operation of a relay ATMR. The operate path for relay ATMR extends through the relay coil, break contacts RT3-5 and TM-3, and make contact RC-2 to ground. Relay AMTR operates it make contact AMTR-5 which activates alarm timer 24.

The operation of relay RC also causes an operation of a relay TM. The operate path extends from relay TM, through break contact BO-8 of timing chain 23, along lead 25 and via make contact RC-5 to ground. The operation of relay TM, in turn, activates timing circuit 14. Specifically, interrupter 17 is activated by the closure of make contact TM-4 which applies a ground signal to lead ST to the interrupter. The closure of make contacts TM-1 extends lead IPM from interrupter 17 to the coil of relay INT which thereafter follows the timing pulses generated by interrupter 17. Transfer contacts INT-5 of relay INT are connected to the first counting stage 16-1 of timing circuit 14 to enable the counting of both operations and releases of relay INT. These transfer contacts are enabled by the closure to make contact TM-5. Make contact TM-5 also applies a ground signal to lead 26 which serves as holding ground for each of the counting relays of stages 16-1 to 16-3. Thus, each time relay INT operates, a ground signal is applied to lead 29 extending to counting state 16-1 by make contacts TM-5 and INT-5 and increments the counting stage by 1. Each time relay INT releases, the ground signal is removed from lead 29 and applied to lead 30 by break contact INT-5, which again increments the counting stage by 1.

The operation of relay TM, by means of its make contact TM-3, also transfers the holding path for relay ATMR to lead 19 for control thereof by timing chain 23.

The first operation of relay INT after activation of timing circuit 14 causes an operation of relay A0 in counting stage 16-1 as shown by the waveforms and truth table of FIG. 3. The operation of relay A0 operates relay RT3 by means of a path that extends from the relay RT3 coil, through break contact RT1-2, make contact A0-12, break contact BPG-5 and make contact RC-5 to ground. Relay RT3, in turn, operates relay RT1 by the path extending from the RT1 coil, through make contact RT3-4, break contact RT2-5 and make contact TM-5 to ground. The relays RT1, RT2 and RT3 form a counting circuit whose function is to count the number of times control circuit 5 is activated immediately following the release of operated bypassing relays BP1 to BPn at the expiration of the timing interval generated by timing circuit 14. This operation is for detecting certain failure conditions and is explained in detail hereinafter.

The operations of relay RT3 and RT1 complete a path to operate relay BPG. This path extends from BPG relay coil through make contacts RT1-3, RT3-3 and RC-5 to ground. Operated make contact BPG-3 provides a permanent holding ground on lead 22 for bypassing relay BP1. Relay BPG, in turn, is held operated by a holding path established through its make contact portion of transfer contact BPG-5 and make contact RC-5 to ground. The break portion of transfer contact BPG-5 interrupts the operate path of relay RT3 and causes a release thereof.

At this time, which is essentially the beginning of the timing interval to be generated by timing circuit 14, the operation of relays TM, RC, BPG and BP1 are under the control of timing circuit 14. As will be seen, all except relay RC will be held operated during this timing interval.

Referring to the waveforms of FIG. 3, it is seen that during the interval from 0 to 2-seconds into the timing interval, the break contacts C2-8 and A1-8 in timing chain 23 maintain continuity between leads 19 and 25 so that relay RC is held operated by the ground potential supplied through make contact RC-5.

At 2 seconds into the timing interval, a number of circuit operations occur which are for the purpose of testing for fault conditions that could result in the permanent operation of relay RC and the continuous operation of control circuit 5. Such faults include, for example, failures of the signal detectors 6-1 to 6-n, or a stuck operated condition of one of the relays DET1 to DETn. Specifically, at 2 seconds, relay A1 of counting stage 16-2 operates and its break contact A1-8 in timing chain 23 interrupts the continuity between leads 25 and 19. Thus, the ground signal applied to lead 25 by make contact RC-5 is removed from lead 19. This, and the presumed disconnection of signal detector 6-1 from line 3-1 by the operation of bypass relay BP1 and the resultant release of relay DET1, should cause the release of relay RC. The removal of ground signal on lead 19 also interrupts the holding path for relay ATMR which releases and deactivates alarm timer 24. At the end of 4 seconds into the timing interval, relay B1 of counting stage 16-2 operates and, by means of its make contact B1-8 in timing chain 23, reapplies ground signal to lead 19. The ground signal reoperates relay ATMR which, in turn, reactivates alarm timer 24. Relay RC should remain released, however, since make contact RC-4 should have released to prevent the reapplied ground signal on lead 19 from reaching relay RC. In the event of a failure causing a ground signal to remain on lead 28, however, relay RC would have remained operated. This, in turn, would have extended the ground signal on lead 28 through make contacts RC-4 and TM-3 to prevent the release of relay ATMR. Alarm timer 24 would not have been deactivated in this event and this would ultimately result in an alarm conditions as will be described in more detail hereinafter.

From the initial operation of relay B1 at 4 seconds into the timing interval until the expiration thereof at 63 seconds, at least one of the make contacts B1-8, A2-8, B2-8, and C2-8 of timing chain 23 is operated to maintain a ground signal on lead 19. This ground signal maintains the operation of relay ATMR and the activation of alarm timer 24. The same contacts in cooperation with transfer contacts A1-8 and B0-8 in timing chain 23 maintain a ground signal throughout to hold the operation of relay TM. Relay TM, in turn, maintains the connection of interrupter 17 to the counting stages of timing circuit 14. Relay BPG is held operated by a ground signal applied to lead 25 by the contacts of timing chain 23. The operation of relay BPG, in turn, maintains the holding path for the operated ones of bypassing relays BP1 to BPn as hereinbefore described.

The control circuit 5 operations that occur at the expiration of the timing interval in the event that one or more other bypass requests are received during the interim are explained hereinafter. For the time being, it is assumed that no other bypass requests have been received. In this event, at 62 seconds into the timing interval, control circuit 5 enters a release sequence.

RELEASE SEQUENCE

An examination of the waveforms in FIG. 3 reveals that at 62-seconds into the timing interval, counting relays A1, B1, A2, and B2 are each released and relay C2 is operated. In this state, the relay contacts in timing chain 23 corresponding to these relays remove ground potential from lead 25 to cause the release of relay BPG. The release of make contact BPG-3 removes the holding ground potential on lead 22 for the bypassing relays BP1 to BPn. The resultant release of the operated bypassing relays reconnects each of the associated signal detectors 6-1 to 6-n to their respective lines. Should a fault condition exist on one of these lines which creates the presence of an invalid bypass request signal, the result is an immediate reoperation of one of the relays DET1 to DETn and an operation of relay RC. This, of course, results in the repetitive operation of control circuit 5. In order to test for such a fault condition, timing chain 23 controls the interrogation of relay RC at 63 seconds into the timing interval, after the release of the bypassing relays, to see if relay RC has reoperated. The means of testing and the results of a failure thereof are explained hereinafter. For the instant discussion, it is assumed that no fault condition exists and that relay RC remains released.

At 63 seconds into the timing interval, relay BO of counting stage 16-1 releases and its transfer contact BO-8 transfers the control of relay TM to the remaining portion of timing chain 23. The relays A1, B1, A2 and B2 are each in released states and C2 is in an operated state at this time. Accordingly, the contacts of these relays in timing chain 23 operate to remove ground potential from relay TM and relay TM releases. The release of make contacts TM-5, TM-1 and TM-4, respectively, disable to counting stages of timing circuit 14 and interrupt leads ST and IPM to disable interrupter 17 and disconnect it from relay INT. Make contact TM-5 also removes holding ground potential on lead 26 for the relays of counting stages 16-1, 16-2 and 16-3, as well as the holding ground potential for relays RT1, RT2 and RT3. Relay AMTR is released by make contact TM-3 disconnecting the relay from lead 19. Relay ATMR, in turn, releases its make contact ATMR-5 to deactivate alarm timer 24. At this point control circuit 5 is in an idle state awaiting the arrival of a new bypass request signal.

OPERATION WITH OVERLAPPING BYPASS REQUEST SIGNALS

During the period extending from 4 seconds to 63 seconds of the timing interval generated by timing circuit 14, timing chain 23 maintains a ground potential on lead 19 as priorly described and relay RC is released pending the receipt of another bypass request signal. Should such a request arrive, say on line 3-n, the signal detector 6-n responds by operating relay DETn, which applies ground potential to lead 28 to operate relay RC. Relay DETn also operates bypassing relay BPn via lead 20. The operation of make contact RC-4 establishes a holding path to lead 19 for relay RC which thereby remains operated throughout the current timing interval.

At 63 seconds, timing chain 23 attempts to disable itself and to release control of circuit 5 by the release of relay BO, whose transfer contacts BO-8 remove ground from the relay TM and transfer relay control to lead 25. The operated make contact RC-5, however, maintains a ground potential on lead 25 to hold the operation of relays TM and BPG. The operated bypassing relays, therefore, remain operated and the counting stages 16-1 to 16-3 continue to count interrupter 17 timing pulses. The counting stages 16-1 to 16-3 pass through the zero count state and begin the generation of a new timing interval. At 2 seconds into the new timing interval, timing chain 23 interrupts lead 19 as priorly described to cause the relay RC and, at 4 seconds, to test for the release of relay RC. At 62 seconds into this new timing interval, control circuit 5 enters the release sequence unless, of course, another bypass request signal is received during the new timing interval. In the latter event, relay RC would have been operated at the time of receipt of the subsequent request and will again cause the reactivation of timing circuit 14 at the expiration of the interval as described above for causing the generation of yet another timing interval during which each of the operated bypassing relays of BP1 to BPn will be held operated. This repetitive operation continues until the expiration of a timing interval during which no new bypass requests are received.

FAULT MONITORING OPERATIONS

Control circuit 5 monitors itself for failure conditions at the beginning of each interval generated by timing circuit 14 and during each release sequence as well. The failure conditions that are detected include conditions that appear as permanent or repetitive bypass request signals and, in addition, conditions that prevent the functioning of timing circuit 14.

The monitoring operation at the beginning of a timing interval occurs only after all appropriate bypassing relays have been operated and the associated bypass request signal detectors disconnected from their lines. The failures detectable at this time include all that result in the permanent operation of relay RC, such as one of the relays DET1 to DETn being stuck or held operated.

The monitoring operation during a release sequence occurs only after the release of bypassing relays and, therefore, may reveal faults detectable when a signal detector is reconnected to its line. Such faults might include, for example, the presence of a permanent request signal on one of the lines 3-1 to 3-n.

With regard to the beginning monitoring operation, break contact A1-8 of timing chain 23 interrupts the ground signal applied to lead 19 by operated make contact RC-5 during the period extending from 2 to 4 seconds of the timing interval, and during this period relay RC should release in the absence of a failure condition. Assuming that relay RC releases, the release of make contact RC-4 and the open condition on lead 19 results in the release of relay ATMR and the deactivation of 85-second alarm timer 24. On the other hand, if a ground signal persists on lead 28 due to a fault, relay RC is held operated and the ground signal on lead 28 is extended through make contact RC-4. This ground signal maintains the operation of relay ATMR and the activation of timer 24. Should timer 24 reach its expiration of 85 seconds, it operates relay ALM to create an alarm condition, the effects of which will be described.

It is possible that during the 2-second period of interruption of lead 19, a valid bypass request signal may be received from one of the signal detectors 6-1 to 6-n. In this event, relay RC is validly operated as result of the request only until associated bypassing relay contacts remove the corresponding signal detector from its line. It is virtually impossible to receive such a valid request which will also result in timer 24 not being deactivated at some point during the 2-second interruption. Nevertheless, in order to insure against this improbable occurrence, a second attempt at deactivating timer 24 occurs either at the end of the current timing interval when control circuit 5 is released, or during the 2-second monitoring period at the beginning of a successive timing interval, whichever occurs first. In either event, the second attempt to deactivate timer 24 occurs before the expiration of its 85-second timing interval and, therefore, before an alarm condition is generated.

The second fault monitoring operation occurs during a control circuit 5 release sequence at 62 seconds into the timing interval. At this time, the C2 relay of counting stage 16-3 is in an operated state and the B2, A2, B1 and A1 relays of counting stages 16-2 and 16-1 are in released states. The contacts of these relays in timing chain 23, when in this state, do not apply ground potential to lead 25. Since the release sequence is initiated only if relay RC is not operated at 62 seconds into the timing interval, make contact RC-5 is not operated and does not apply ground potential to lead 25. The holding ground for relay BPG is therefore interrupted causing the relay to release. The release of make contact BPG-3 removes ground potential from lead 22 to cause the release of all operated bypassing relays BP1 to BPn. This, in turn, reconnects the associated ones of signal detectors 6-1 to 6-n to the respective lines and may cause the immediate operation of relay RC in the presence of a fault or valid bypass request signal. If relay RC is operated, it is held operated by the ground potential placed on lead 19 by operated make contact C2-8 in timing chain 23.

At 62-½ seconds into the interval, relay AO operates. This and the fact that relay BPG was just released causes the operation of relay RT2. The operate path extends from the RT2 relay coil through break contact RT2-4, make contact RT1-4, break contact RT3-2, make contact AO-12, break contact BPG-5 and make contact RC-5 to ground. The state of relays RT1 and RT2 operated causes relay BPG to again operate and supply holding ground potential on lead 22 to hold operated the bypassing relay associated with one of the detectors 6-1 to 6-n that resulted in the operation of relay RC. The operate path for relay BPG extends from the BPG coil through make contacts RT1-3, RT2-3 and RC-5 to ground.

The reoperation of relay BPG above causes break contact BPG-5 to interrupt the operate path for relay RT1, which then releases. Relay RT2 is held operated, however, by the path extending from the RT2 coil through make contacts RT2-5 and TM-5 to ground. The state of relay RT2 operated and RT1 released signifies to control circuit 5 that this is the second possible receipt of a false request signal from one of the signal detectors 6-1 to 6-n.

At 63 seconds into the timing interval, relay BO releases and connects relay TM to lead 25. Since the RC relay is operated at this time, ground potential is supplied to lead 25 by make contact RC-5. This maintains the operation of relay TM which, in turn, holds the connection of interrupter 17 to relay INT. The counting stages 16-1 to 16-3 continue to count interrupter 17 pulses to the zero count state and this results in the generation of another timing interval. Holding ground for bypassing relays BP1 to BPn is supplied to lead 22 by make contact BPG-3 during this new interval. Control circuit 5 operations occur during the new timing interval as described for any other interval. Early in the beginning of the interval, relay RC is released by timing chain 23, and the relay remains released for the duration of the interval, assuming that no other bypass requests are received. At 62 seconds into the interval, relay BPG is again released if no other bypass requests have been received; any operated bypassing relays are released and the associated ones of signals detectors 6-1 to 6-n are connected to their respective lines. An immediate reoperation of the RC relay at this time would be the third such occurrence and, in that event, steps are initiated to place control circuit 5 into an alarm state. Relay RT3 is operated by means of a path extending from the RT3 coil through break contact RT1-2, make contact AO-12, break contact BPG-5 and make contact RC-5 to ground. The BPG relay is prevented from reoperating by the released make contact RT1-3. Make contact RT3-5 operates and applies a ground potential directly to relay ATMR to insure that alarm timer 24 remains active. At the expiration of the 85-second timing interval of alarm timer 24, relay ALM is caused to operate. Break contacts ALM-4 and ALM-5 interrupt leads 21 and 22, respectively, to release all operated bypassing relays and to prevent any further operation thereof. Other contacts of the ALM relay (not shown) operate to sound an audible alarm for the purpose of alerting exchange personnel to the alarm condition.

Alarm timer 24 also aids in the detection of failures that result in the nonfunctioning of timing circuit 14 or of interrupter 17. As described earlier, alarm timer 24 is activated at the time of receipt of an initial bypass request and at 4 seconds into each timing interval generated by timing circuit 14. Assuming that timing circuit 14 or interrupter 17 is nonfunctional, that is, the count state of circuit 14 is not progressing, the operations of control circuit 5 do not progress and no occasion occurs to deactivate timer 24. Timer 24 accordingly times-out after 85 seconds and operates relay ALM to place control circuit 5 into the alarm state.

After control circuit 5 has been placed into the alarm state by the operation of relay ALM, timing circuit 14 is allowed to remain active in spite of the fact that no bypassing relays may be operated. This facilitates automatic recovery of control circuit 5 in the event the failure precipitating the alarm state is repaired or inadvertently disappears. For a failure which results in the continuous operation of relay RC, the relay TM is held operated by make contact RC-5 which supplies ground potential to lead 25 and by ground potential supplied by make contact BO-8 of timing chain 23. Operated relay TM maintains the connection of interrupter 17 to timing circuit 14 so that the timing circuit either continues to function or remains able to function when the failure condition disappears. Assuming that it is operative, timing circuit 14 merely generates successive timing intervals and controls circuit 5 to perform all of its functions except the operation of bypassing relays.

For a fault condition that results in the reoperation of relay RC each time the operated bypassing relays are released, the RC relay is held operated by virtue of the fact that the operated relay ALM maintains all bypassing relays released. Additionally, timing chain 23 maintains a ground potential on lead 19 at all times for holding relay RC operated, except during the 2-second monitoring period at the beginning of each timing interval. The operated RC relay maintains the operation of relay TM and the resultant activation of timing circuit 14 as above described.

For a failure that results in the nonfunctioning of timing circuit 14, the interrupter 17 remains connected to the timing circuit and the timing circuit may proceed to function as normal at the time the failure condition disappears. At this time, if the count state of stages 16-1 to 16-3 place timing circuit 14 at the beginning of a timing interval, then at 2 seconds into the interval relay A1 operates and its break contact A1-8 in timing chain 23 interrupts lead 19 to release the RC and ATMR relays. Relay ATMR released causes the release of relay ALM to remove control circuit 5 from the alarm state. Control circuit 5 cycles through the remainder of the timing interval and returns to idle at the expiration thereof if no bypass requests have been received during the interim. If the count state of stages 16-1 to 16-3 have been advanced into the timing interval at the time that counting was resumed, control circuit 5 may be idled at the expiration of the interval, or, depending on the state of the RC relay, it may recycle to begin another timing interval. The alarm state will be removed if control circuit 5 idles or it will be removed at 2 seconds into the next timing interval, if another timing interval is generated.

For the remaining types of fault conditions that precipitate an alarm state, the timing circuit 14 continues to recycle until it reaches the beginning of the first regenerated timing interval to occur after the disappearance of the fault condition. At 2 seconds into this timing interval, relay A1 of timing circuit 14 operates and its break contact A1-8 removes ground potential from lead 19. With the fault condition corrected, relay RC is thus allowed to release. The removal of ground potential on lead 19 causes relay ATMR to release which, in turn, resets timer 24. Timer 24 then releases the ALM relay to remove the alarm state. Timing circuit 14 continues to count until it reaches the expiration of the timing interval and at that time control circuit 5 returns to an idle state assuming no new bypass requests have been received.

It is understood that the above-described arrangement is merely illustrative of the application of the principles of the invention and that other arrangements may be devised by those skilled in the art without departing from the spirit and scope of the invention.

What is claimed is:

1. For use in a system including a plurality of telephone lines coupled to a different auxiliary circuit and means for decoupling each auxiliary circuit from its respective line, a circuit for controlling each of said decoupling means, said controlling circuit comprising means for operating individual ones of said decoupling means upon receipt of request signals individually associated therewith, means responsive to a first said request signal for holding operated an associated one of the decoupling means for at least a prescribed time interval, and means responsive to a subsequent said request signal received during said prescribed time interval for controlling said holding means to hold operated each operated said decoupling means for at least another said prescribed time interval.

2. The invention of claim 1 wherein said holding means comprises timing means operable for generating said prescribed time interval, and means controlled by said timing means for supplying a hold signal to each of said operated decoupling means.

3. The invention of claim 2 wherein said controlling circuit further comprises means for detecting a failure of said timing means, and alarm state means operated by said detecting means for disabling the operation of each said decoupling means.

4. The invention of claim 2 wherein said holding means further comprises means responsive to said first request signal for activating said timing means, and said controlling means comprises means for reactivating said timing means.

5. The invention of claim 4 wherein said reactivating means comprises means for storing an indication of receipt of said subsequent request signal, and means responsive to said storing means at an expiration of said prescribed time interval for operating said timing means to generate another said prescribed time interval.

6. The invention of claim 4 wherein said timing means comprises a source of periodic pulses and counter means, and said activating means comprises means operable for connecting said source to said counter means.

7. The invention of claim 6 wherein said timing means further comprises means responsive to said operating means for generating a control signal to operate said connecting means when said counter means is in a prescribed initial state and to remove said control signal when said counter means is in a second prescribed count state.

8. The invention of claim 7 wherein said reactivating means comprises means for maintaining an operation of said connecting means when said counter means reaches said second prescribed count state.

9. The invention according to claim 1 wherein said operating means comprises a plurality of request signal detectors each coupled to a different one of said lines and each being operative for detecting a said request signal applied to its respective line.

10. The invention of claim 1 wherein said controlling circuit further comprises means for monitoring for prescribed fault conditions of said controlling circuit, and alarm state means activated by said monitoring means for disabling the operation of each of said decoupling means.

11. The invention of claim 10 wherein said controlling circuit further comprises means for automatically releasing said alarm state means in response to the disappearance of said prescribed fault conditions.

12. The invention of claim 10 wherein said monitoring means comprises means for detecting a said request signal persisting for greater than a preselected period of time.

13. The invention of claim 1 wherein said operating means comprises a plurality of request signal detectors individually coupled to separate ones of the lines and each for generating a prescribed output signal in response to a said request signal applied to an associated line, and wherein each of said decoupling means comprises means for disconnecting an associated one of said detectors from its line during an operation of the decoupling means.

14. The invention of claim 13 wherein said holding means comprises first timing means including means for generating control signals in accordance with the elapsed time state of said first timing means, means controlled by a first said control signal for activating said first timing means upon receipt of said first request signal when said first timing means is in a first time state, and means controlled by a second said control signal for providing a holding path for each said operated decoupling means for the duration of said prescribed time interval.

15. The invention of claim 14 wherein said controlling means comprises storage means operated to a first state upon receipt of said subsequent request signal during said prescribed time interval, means jointly responsive to said first timing means at an expiration of said prescribed time interval and to said storage means in said first state for reactivating said first timing means to produce a second said prescribed interval, and means controlled by said storage means in said first state for maintaining the operation of operated ones of said decoupling means during the reactivation of said first timing means.

16. The invention of claim 15 wherein said controlling circuit further comprises means for detecting a said prescribed output signal after an operation of said disconnecting means, and alarm state means operated by said detecting means for disabling the operation of each of said decoupling means.

17. The invention of claim 16 wherein said detecting means comprises second timing means activated on receipt of a first said output signal for generating a predetermined time period greater in duration than said prescribed time interval, and means for deactivating said second timing means in response to the disappearance of said first output signal after an operation of said disconnecting means, and wherein said alarm state means comprises means enabled by said second timing means at an expiration of said predetermined time period for interrupting the operate and hold paths of each of said decoupling means.

18. The invention of claim 15 wherein said controlling circuit further comprises means enabled at the expiration of a said prescribed time interval and after a release of said disconnecting means for testing for the resultant regeneration of a said output signal, means enabled at each expiration of said prescribed time interval for counting the number of occurrences of said regeneration of a said output signal, and alarm state means responsive to a prescribed count state of said counting means for disabling the operation of each of said decoupling means.

19. The invention of claim 1 wherein said operating means comprises a plurality of request signal detectors each for detecting a said request signal associated with a separate line and for producing an output signal in response thereto to operate an associated one of said decoupling means, and wherein said holding means comprises a first device operated in response to a said output signal from any one of said detectors, first timing means for generating said prescribed time interval, a second device responsive to an operation of said first device for activating said first timing means, a third device operated in response to said first timing means for providing an operate hold path for each operated one of said decoupling means, means for releasing said first device after an activation of said first timing means, and means responsive to a reoperation of said first device during said prescribed time interval for maintaining said first device reoperated, and wherein said controlling means comprises means activated by said first device when reoperated for reactivating said first timing means at the expiration of said prescribed time interval.

20. The invention of claim 19 wherein each said decoupling means comprises means for disconnecting an associated request signal detector from a line, and said controlling circuit further comprises second timing means for generating a predetermined time period greater in duration than said prescribed time interval, means controlled by said second device for activating said second timing means on receipt of a said output signal from one of the detectors, means controlled by said first timing means during said prescribed time interval for deactivating said second timing means in the absence of said output signal after an operation of said disconnecting means, means controlled by said first timing means after an operation of said deactivating means for reactivating said second timing means, and a fourth device enabled by said second timing means at an expiration of said predetermined time period for interrupting said operate hold path and including means for preventing the further operation of any of said decoupling means.

21. The invention of claim 19 wherein said first device and said first timing circuit cooperate for sensing a said output signal within a predetermined interval after a release of said third device, and wherein said controlling circuit further comprises a counter for counting the number of times a said output signal is sensed within said predetermined interval in a sequence of successively reactivated said prescribed time intervals, and means responsive to a predetermined count state of said counter for disabling the operation of each of said decoupling means.

22. For use in a system including a plurality of telephone lines each equipped with an auxiliary circuit interposed in the respective line and means for bypassing the associated auxiliary circuit, a circuit for controlling each of said bypassing means, comprising means for operating ones of the bypassing means in response to request signals identifying individual bypassing means, first timing means operated in response to a first said request signal for controlling the release of each operated bypassing means at the expiration of a time period generated by said first timing means, and means responsive to a receipt of a subsequent said request signal received during said time period for extending the duration of said time period.

23. The invention of claim 22 wherein said first timing means comprises means for generating a first control signal at the expiration of a prescribed time interval to initiate a test for the receipt of said subsequent request signal.

24. The invention of claim 23 wherein said first timing means comprises means for generating said prescribed time interval and said time duration extending means comprises means responsive to said first control signal for reactivating said first timing means in the presence of receipt of said subsequent request signal.

25. The invention of claim 24 wherein said controlling circuit further comprises means responsive to said first control signal for releasing operated ones of said bypassing means in the absence of receipt of said subsequent request signal.

26. The invention of claim 25 wherein said operating means comprises a plurality of request signal detectors each associated with an individual one of said lines for producing an output signal in response to the detection of a said request signal applied to its associated line, and wherein each said bypassing means comprises means for disconnecting an associated one of said detectors from its line when the bypassing means is operated.

27. The invention of claim 26 wherein said first timing means further comprises means for generating a second control signal after an operation of one of said disconnecting means to initiate a test for a said output signal.

28. The invention of claim 27 wherein said first timing means further comprises means for generating a third control signal at a prescribed time after the release of operated ones of said bypassing means to test for a said output signal.

29. The invention of claim 28 wherein said controlling circuit further comprises second timing means activated upon receipt of said first request signal for generating a second time period greater in duration than said prescribed time interval, means controlled by said second control signal for deactivating said second timing means in the absence of a said output signal, and alarm state means operated by said second timing means upon an expiration of said second time period for disabling the operation of each of said bypassing means.

30. The invention of claim 29 wherein said controlling circuit further comprises means controlled by said third control signal for counting the number of times in which a said output signal appears within said prescribed time after the release of said operated bypassing means, and means responsive to a prescribed state of said counting means for operating said alarm state means.

31. The invention of claim 30 wherein said controlling circuit further comprises means for repetitively reactivating said first timing means at the expiration of each said prescribed time interval during said alarm state, and means controlled by said first timing means for automatically releasing said alarm state means upon the disappearance of a said output signal.

32. In combination, an arrangement comprising a plurality of telephone line extender circuits each for connection with a different telephone line, a plurality of bypass relays individually associated with separate ones of the line extender circuits, and each being for effectively removing the telephone line connection of its associated line extender circuit, and a control circuit having timing relays, relay means, and a timing chain consisting of prescribed contacts of said timing relays providing signal continuity to said relay means during prescribed time periods to control the operation of said bypassing relays during the activation of said timing relays, whereby said relay means is responsive to a first bypass request signal for controlling the activation of said timing relays, and further responsive to a second said bypass request signal received during an activation of said timing relays for controlling the reactivation of said timing relays.

* * * * *

UNITED STATES PATENT AND TRADEMARK OFFICE
CERTIFICATE OF CORRECTION

PATENT NO. : 4,056,687

DATED : November 1, 1977

INVENTOR(S) : Robert D. Sims

It is certified that error appears in the above-identified patent and that said Letters Patent are hereby corrected as shown below:

```
Column 1, line 15, after "coupled" insert --to--; line 28,
delete "to", second occurrence, and insert --by--.  Column 2,
line 10, "lines" should read --line--.  Column 4, line 23,
"delays" should read --relays--.  Column 5, line 38, "AMTR"
should read --ATMR--; line 39, "AMTR-5" should read --ATMR-5--;
line 54, "to" should read --of--.  Column 6, line 19, "relay"
should read --relays--; line 20, after "from" insert --the--.
Column 7, line 6, "conditions" should read --condition--;
line 66, "to" should read --the--.  Column 8, line 4, "AMTR"
should read --ATMR--; line 39, after "the", first occurrence,
insert --release of--.  Column 9, line 27, after "as" insert
--a--.
```

Signed and Sealed this

Thirty-first Day of October 1978

[SEAL]

Attest:

RUTH C. MASON
*Attesting Officer*

DONALD W. BANNER
*Commissioner of Patents and Trademarks*